No. 823,945. PATENTED JUNE 19, 1906.
G. B. HENRY & A. MARSH.
FOLDING POULTRY CRATE.
APPLICATION FILED JULY 6, 1905.
2 SHEETS—SHEET 1.
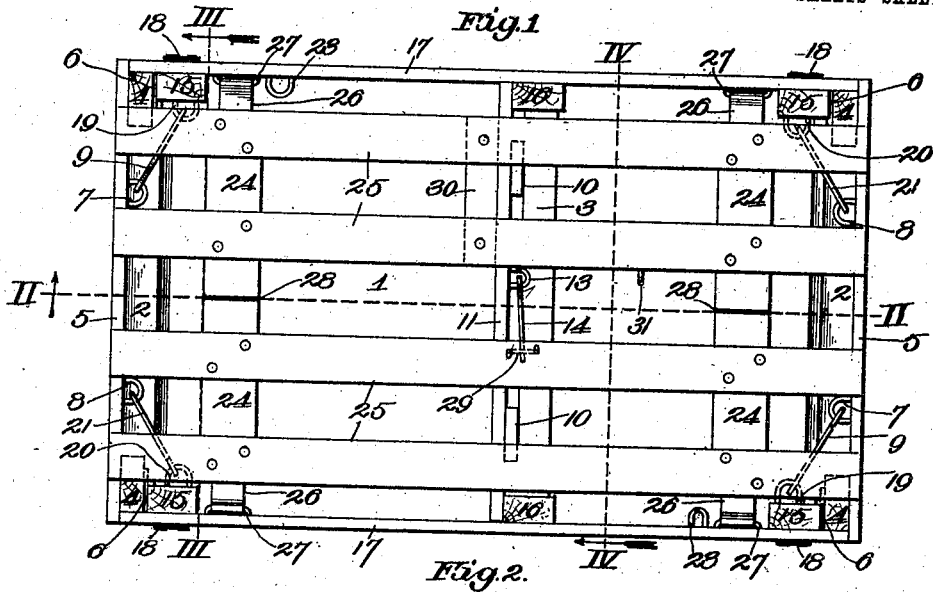
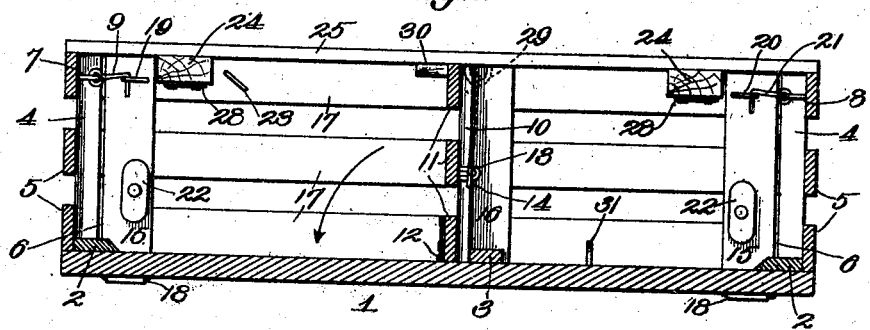
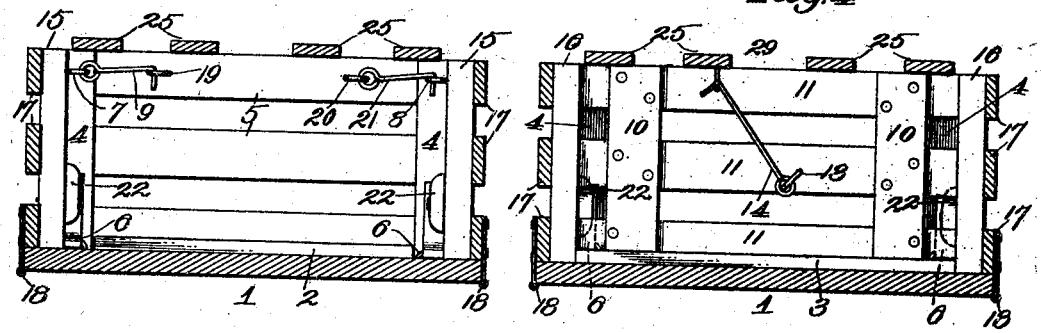
Witnesses
Frank R. Glow.
H. C. Rodgers.
Inventors
G. B. Henry and A. Marsh
By George J. Thorpe
atty.

No. 823,945. PATENTED JUNE 19, 1906.
G. B. HENRY & A. MARSH.
FOLDING POULTRY CRATE.
APPLICATION FILED JULY 6, 1905.
2 SHEETS—SHEET 2.
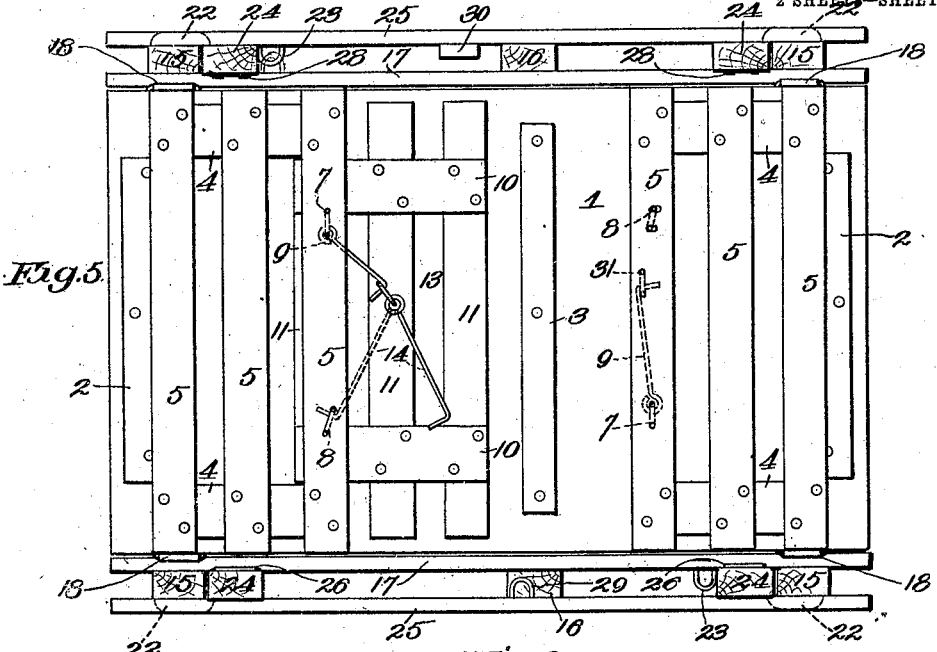
Fig. 5
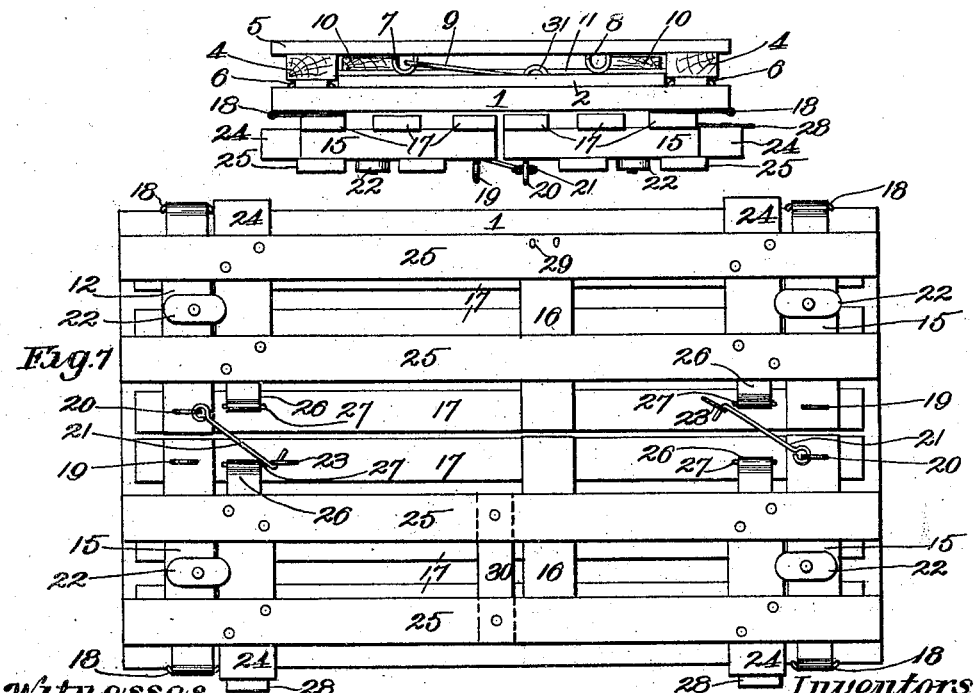
Fig. 6
Fig. 7
Witnesses
Frank R. Slow.
H. C. Rodgers.
Inventors
G. B. Henry
A. Marsh
By George H. Thorpe
Atty.

UNITED STATES PATENT OFFICE.

GEORGE B. HENRY AND ALEXANDER MARSH, OF GERSTER, MISSOURI.

FOLDING POULTRY-CRATE.

No. 823,945.  Specification of Letters Patent.  Patented June 19, 1906.

Application filed July 6, 1905. Serial No. 268,423.

*To all whom it may concern:*

Be it known that we, GEORGE B. HENRY and ALEXANDER MARSH, citizens of the United States, residing at Gerster, in the county of St. Clair and State of Missouri, have invented certain new and useful Improvements in Folding Poultry-Crates, of which the following is a specification.

Our invention relates to poultry coops or crates; and our object is to produce a structure of this character which is of simple, strong, durable, and cheap construction, which can be set up in operative form or disposed in a folded or knockdown form easily and quickly, and which is of such character that it can be secured reliably in either form without the use of nails, screws, or rivets.

To this end the invention consists in certain novel and peculiar features of construction and organization, as hereinafter described and claimed, and in order that it may be fully understood reference is to be had to the accompanying drawings, in which—

Figure 1 is a top plan view of a poultry-coop embodying our invention. Fig. 2 is a vertical section on the line II II of Fig. 1. Fig. 3 is a vertical section on the line III III of Fig. 1. Fig. 4 is a vertical section on the line IV IV of Fig. 1. Fig. 5 is a top plan view of the crate with the ends and partition folded down and secured upon the bottom and the sides hanging pendently and the top sections folded back into the sides and so secured. Fig. 6 is an end view of the crate in its knockdown condition—that is, with the end portions and partition arranged as shown in Fig. 5 and with the sides and top sections secured together as in Fig. 5 and then folded up against the under side of the bottom and so secured. Fig. 7 is an inverted plan view of the coop or crate in its folded or knockdown condition.

In the said drawings, 1 indicates the bottom of the coop, the same being of oblong rectangular form and provided near its ends with cross-cleats 2 and near its middle with a cross-cleat 3. The end walls of the coop or crate comprise posts 4, connected by slats 5 and hinged, as at 6, to the upper side of the bottom, so that when said end walls are in operative position they shall rest upon the bottom with their posts at opposite ends of cleats 2 and their lower slats 5 upon the bottom and outward of cleats 2. At diagonally opposite points the end walls are provided with inwardly-projecting staples 7 and 8, and pivotally connected to staples 7 are hooks 9.

The coop is provided with a partition comprising posts 10 and slats 11, secured to and projecting beyond the posts, the lowest slat being hinged, as at 12, to the bottom 1, so that when the partition is upright it shall rest upon the bottom with its posts 10 against cleats 3, as shown clearly in Figs 1 and 2. Projecting from the partition at the same side as cleat 3, by preference, is a staple 13, to which is pivotally connected a hook 14.

The side walls of the coop comprise end posts 15 and middle posts 16, connected by slats 17, the undermost slats being hinged, as at 18, to the lower side margins of bottom 1, the arrangement being such that when the side walls are disposed in operative position posts 15 and 16 rest upon the bottom at opposite ends, respectively, of cleats 2 and 3, with the posts 15 disposed between posts 4 of the end walls. At diagonally opposite corners and projecting inwardly from posts 15 are staples 19 and 20, the former for engagement by hooks 9, and staples 20, carrying hooks 21 for engagement with staples 8 of the end walls, these hooks and staples being utilized for securing the end walls and side walls reliably in a vertical position. Secured to the inner sides of posts 15 are turn-buttons 22, and projecting inwardly from the side walls at diagonally opposite points and inward of contiguous posts 15 are staples 23.

The top wall of the coop consists of two sections, each comprising a pair of end bars 24 and connected by longitudinally-extending slats 25, the latter corresponding in length to the bottom and adapted when the sections are folded down in operative position to rest upon the topmost slats 5 of the end walls. The end bars 24 are arranged inward of posts 15 of the side walls and are provided with arms 26, hinged, as at 27, to the topmost slats 17 of the side walls. At the inner ends of the end bars of one section are provided plates 28, forming shoulders, which underlie the corresponding ends of the end bars of the other top section when the crate is in operative condition, and depending from the innermost slat connecting said overlapping end bars is a staple 29, engaged when the coop is in its operative position by the hook 14 of the partition, this relation of parts holding the top wall reliably in place, the top section having the underlying shoulder having a cross-bar 30 to bear against the topmost slat of the partition at the opposite side from cleat 3 to guard against any tendency of the partition to swing downward and impose a lateral pull upon hook 14, which would tend to dislodge it from engagement with staple 29.

31 is a staple projecting upward from bottom 1 for a purpose which is hereinafter explained.

When the crate is to be shipped in folded or knockdown condition, the hook 14 is disengaged from the staple 29 to unlock the top sections to permit them to be raised, so as to withdraw cross-bar 30 from the path of the partition and permit it to be folded down upon the bottom 1 in the direction indicated by the arrow, Fig. 2. Hooks 9 and 21 are then disengaged from staples 19 and 8, respectively, to permit the side walls to be swung outward until they assume a vertically pendent position, as indicated in Fig. 5, the top sections, after the side walls are swung to such position, being folded upward and inward until their end bars 24 assume positions parallel with and squarely between the end posts 15 of the side walls and against the slats 17 thereof, as shown clearly by Sheet 2 of the drawings, the turn-buttons being then turned, as shown by dotted lines, Fig. 5, and full lines, Figs. 6 and 7, to engage said end bars 24 and lock the top sections in the relation described. The end walls are then folded inwardly until they rest on top of the bottom, one of them being so secured by the engagement of its hook 9 with staple 31, projecting upward from the bottom. The topmost slat of the other end wall overlaps the normally upper portion of the previously-folded partition, as shown clearly in Fig. 5, and then hook 14 is caused to engage staple 8 of said end wall, as indicated by dotted lines, Fig. 5, so as to lock said end wall and the partition in the relation described. The folded side walls and the top sections are then folded, with hinges 18 as their pivotal points, up against the under side of the bottom 1, and hooks 21 of the side walls are caused to engage the staples 23 of the side walls to lock said side walls and top section in the relation described, as shown most clearly in Fig. 7. It will thus be seen that the idea of pivoting the hooks 9 to the end walls and the corresponding hooks 21 to the side walls was not haphazard, but was for the purpose of utilizing such hooks in securing the crate in its folded condition, it being understood that the hook 9 of the end wall overlapping the partition may be caused to engage staple 13, and thus doubly lock said side wall and partition in folded condition, as shown in Fig. 5.

From the foregoing it will be apparent that the entire coop or crate is self-contained—that is to say, that all of its parts are permanent parts, as distinguished from keys, cotters, and other detachable devices—and in consequence the possibility of any of the parts of the crate or coop being lost is reduced to the minimum.

From the above description it will be apparent that we have produced a poultry coop or crate which when made full size and of material of proper proportions will occupy a space of the same length and width as the crate "set up;" but in depth the space occupied will be but slightly more than the combined thickness of slats 5, posts 4, bottom 1, slats 17, posts 15, and slats 25. Because of this fact it is obvious that approximately four car-loads of crates set up can be reshipped when folded in a single car.

It is to be understood that we reserve the right to make such changes in the form, proportion, detail, construction, and arrangement of the parts as shall not be a departure from the appended claims.

Having thus described the invention, what we claim as new, and desire to secure by Letters Patent, is—

1. A poultry-crate, consisting of a bottom, end walls hinged to the bottom to fold inwardly upon the upper side of the same, side walls hinged to the bottom to fold outwardly and up against the under side of the bottom, staples projecting inwardly from the end and side walls near their ends, diagonally opposite hooks permanently hinged to the contiguous staples of the end walls and detachably engaging the contiguous staples of the side walls, diagonally opposite hooks permanently hinged to the other pair of staples of the side walls and detachably engaging the other pair of staples of the end walls, a partition hinged to the bottom a top wall for closing the upper side of the crate, said top walls consisting of two sections hinged at their outer edges to the upper parts of the side wall and adapted to fold down upon the end walls, plates secured to and projecting from one of the top wall-sections under the other, a staple depending from the overlying top wall-section, and a hook pivotally secured on the side of the partition and arranged to engage said staple to secure said top wall-section down upon the plates of the other section and upon the end walls.

2. A poultry-crate, comprising a bottom, end walls adapted to stand upright on the bottom and hinged thereto to fold down upon the upper side of the latter, a partition adapted to stand upon the bottom and hinged thereto to fold down upon the latter, side walls adapted to stand upon the bottom and hinged thereto to fold outwardly and up against the under side of the same, means to secure the side and end walls detachably together when occupying their upright positions, a top wall consisting of a pair of sections hinged at their outer edges to the upper parts of the side walls and adapted to fold down upon the end walls and partition, plates secured to one of the top wall-sections and underlying the other when resting upon said side walls and partition, a cross-bar secured to the top wall-section and adapted to engage against the side of the partition at the side toward which it folds, bars secured rigidly to the inner sides of the side walls to engage against the opposite side of the partition whereby the partition will be held rigidly upright by said side bars and the said cross-bar, and a staple-and-hook connection between the partition and the overlying top wall-section.

3. In a poultry-crate, a bottom, side walls hinged thereto to fold outwardly and up against the under side of the bottom and consisting of end bars and connecting-slats, and top wall-sections hinged at their outer sides to the upper parts of the side walls inward of the end bars of the latter and consisting of cross-bars and connecting-slats, the former being adapted to fold against the inner side of the side walls after the latter have been swung outwardly, and turn-buttons carried by and at the inner sides of the end bars of the side walls and adapted when the top wall-sections are folded against the side walls to engage the normally upper sides of the cross-bars of said top wall-sections.

4. In a poultry-crate, a bottom, end walls hinged to the bottom to fold down upon the upper side of the same and a partition hinged to the bottom to fold down upon the upper side of the same, and below one of the end walls, and a hook-and-staple connection for securing said partition and overlying end wall in the relation described, and a hook-and-staple connection for securing the other end wall to the bottom.

5. A crate comprising a bottom, end walls hinged thereto, side walls also hinged to the bottom, each of said walls having a hook at one end and a staple at the opposite end, each hook engaging the staple at the contiguous end of the abutting wall when the walls are raised, top wall-sections hinged to the side walls and arranged to overlap at their inner edges, a central partition hinged to the bottom, a staple on said partition arranged to be engaged by a hook on one of the end walls when the crate is folded, and a hook carried by said staple and arranged to engage the end wall when the crate is folded and to engage one of the top wall-sections when the crate is adjusted for use.

6. A foldable coop or crate comprising a bottom having transverse cleats on its upper side at its center and near its ends, ends hinged to the bottom to fold down upon the same and consisting of posts and slats connecting the posts and arranged to have the posts at the ends of the end transverse cleats and the lowermost slats upon the bottom and outward of said cleats when the ends are upright, a central transverse partition hinged to the bottom and arranged to have its posts against the central transverse cleat when upright, sides hinged to the bottom to fold under the same and consisting of slats and posts arranged to have the posts fit between and against the posts of the opposite ends when the sides are upright, means on the sides and ends for connecting them in their upright positions, top members hinged to the free edges of the sides and arranged to have their ends rest on the upper edges of the foldable ends when the crate is not folded and to lie against the sides beneath the bottom when the crate is folded, a cross-bar on one of the top members arranged to bear against the central partition at the side opposite the central transverse cleat, means for holding the top members together and down upon the ends and the partition, and turn-buttons on the end posts of the sides arranged to engage the end bars of the top members when the crate is folded.

In testimony whereof we affix our signatures in the presence of two witnesses.

GEORGE B. HENRY.
ALEXANDER MARSH.

Witnesses:
J. E. PERKINS,
DÉLÉNÉ BLONDON.